Dec. 1, 1964  R. E. MacMILLAN  3,159,175
FLUID CHECK VALVE UNIT
Filed Dec. 12, 1961
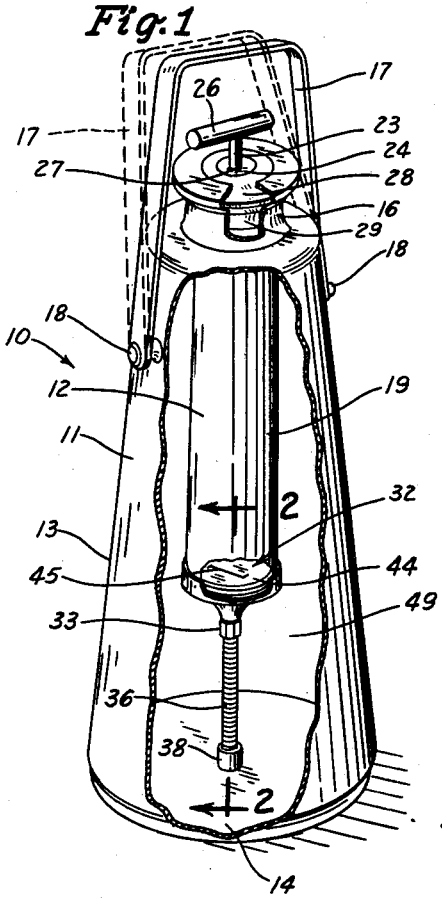
Fig. 1
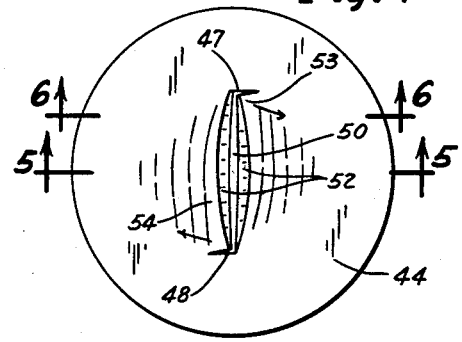
Fig. 4
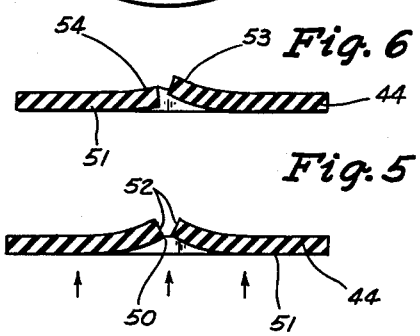
Fig. 6
Fig. 5
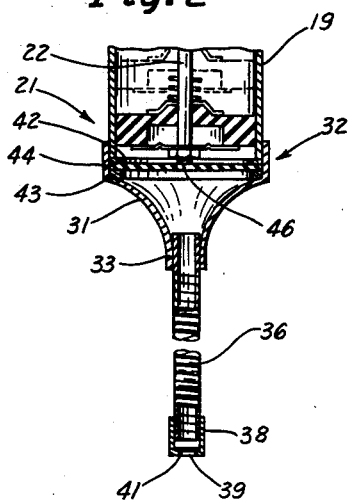
Fig. 2
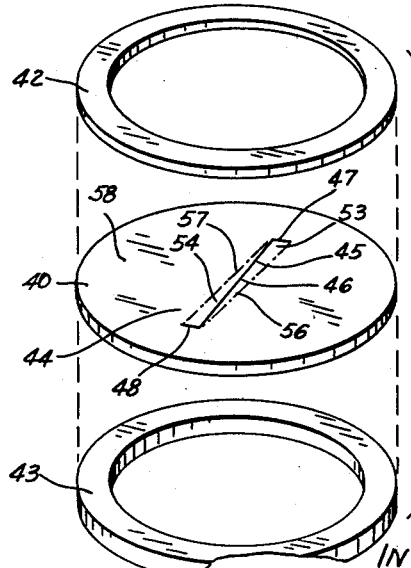
Fig. 3
INVENTOR
ROBERT E. MACMILLAN
BY Lowell & Henderson
ATTORNEYS

United States Patent Office 3,159,175
Patented Dec. 1, 1964

3,159,175
FLUID CHECK VALVE UNIT
Robert E. MacMillan, Detroit, Mich., assignor to The Delman Company, Cookeville, Tenn., a corporation of Tennessee
Filed Dec. 12, 1961, Ser. No. 158,679
3 Claims. (Cl. 137—493)

This invention relates generally to liquid containers and more particularly to a check valve therefor.

An object of this invention is to provide a novel check valve.

Another object of this invention is to provide a check valve wherein a resilient element is formed with a slit type valve means operable to either prevent or permit the passage of fluid therethrough.

A further object of this invention is the provision of a resilient element for use as a check valve in which a slit type valve means is formed, in a manner to minimize tearing of the valve means during use.

Yet another object of this invention is the provision of a check valve as characterized hereinbefore which is economical of manufacture, simple in construction, and effective in operation.

These objects, and other features and advantages of this invention will become readily apparent upon reference to the following description and accompanying drawing, wherein:

FIG. 1 is a perspective view of a combined container and pump, with portions thereof broken away to show the check valve of this invention;

FIG. 2 is an enlarged fragmentary sectional view of the pump taken along the line 2—2 in FIG. 1;

FIG. 3 is an enlarged, exploded view of the check valve unit of this invention;

FIG. 4 is a plan view of the check valve element shown in the distorted position it assumes in response to fluid pressure on the underside thereof;

FIG. 5 is a sectional view of the distorted check valve element taken along the line 5—5 in FIG. 4; and FIG. 6 is a sectional view taken along the line 6—6 in FIG. 4.

Referring to the drawing, a container pump combination is designated generally at 10 in FIG. 1 and includes a container 11 and a pump 12 adapted to be removably inserted into the container 11.

The container 11 comprises a side wall 13 of a generally frustro-conical shape, a bottom wall 14, and a curved neck portion 16 forming an opening (not shown) at the top of the container 11. A bail 17 is pivotally connected to the side wall 13 by a pair of pivots 18.

The pump 12 is of piston type and comprises an elongated cylinder 19 and a piston unit 21 (FIG. 2) having a piston rod 22, a portion 23 of which extends externally of the cylinder 19 through its top 24 (FIG. 1). A handle 26 is connected to the exposed portion 23 for manually reciprocating the piston unit 21 within the cylinder 19.

An opening 27 (FIG. 1) is provided in the cylinder top 24 through which air under atmospheric pressure can enter the cylinder 19. An annular collar 28 of a resilient material such as rubber is bonded or otherwise affixed to the cylinder top 24 and includes a downwardly tapered lower section 29 receivable within the container neck portion 16. By this arrangement, upon insertion of the pump 12 into the container 11, the interior 49 of the container 11 is sealed from the atmosphere.

A cap 31 (FIG. 2) is threaded about the lower end of the cylinder 19, and coacts with a check valve unit indicated generally at 32 in FIGS. 1 and 2. The cap 31 narrows down to a neck portion 33 to which is attached a flexible tube 36. A ferrule 38, open at the end 39, is clamped about the lower end of the tube 36. To prevent impurities from being drawn into the cylinder 19, a wire mesh screen 41 is provided on the ferrule 38 at the end of the tube 36.

Referring now to FIGS. 3–6 inclusive, the check valve unit 32 of this invention comprises a pair of gaskets 42 and 43 (FIG. 3) mounted on the upper and lower sides, respectively, of a check valve element 44. In assembly, the gaskets 42 and 43 are clamped securely about the peripheral edge 40 of the valve element 44 by the threaded engagement of the cap 31 with the cylinder 19 (FIG. 2).

The valve element 44 is substantially flat, circular, and is of a resilient material such as rubber or neoprene. Centrally of the valve element 44, an incision or slit 45 is formed which is Z-shaped in plan view. The slit 45 includes a straight main leg 46 and a pair of straight end legs 47 and 48. The end legs 47 and 48 are equal in length, are shorter than the main leg 46, and extend at right angles to the main leg 46 and in opposed directions relative to each other. Under normal circumstances of non-use, the slit 45 is closed to the passage of fluid therethrough.

In use, assume the pump 12 and the container 11 to be in their assembly relation shown in FIG. 1. In this position of the pump 12, the collar 28 frictionally coacts with the neck portion 16 to seal off the interior 49 of the container from the atmosphere. The bail 17 is moved from its normal full line position of FIG. 1 above the handle 26, to a position to its side, as shown by dotted line in FIG. 1. To withdraw a liquid solution (not shown) from the container 11, the pump handle 26 is pulled upwardly and away from the cylinder 19. This movement creates a vacuum below the piston unit 21 as it moves from the full line position of FIG. 2 to the dotted line position thereof toward the top 24 of the cylinder 19, forcing air out of the opening 27 as it moves upwardly.

Due to the vacuum created in the cylinder 19 above the check valve unit 32, the resultant application of the solution under pressure in an upward direction against the underside 51 (FIG. 5) of the valve element 44, as indicated by the arrows in FIG. 5, distorts the normally flat valve 44 as illustrated in FIGS. 4–6, inclusive. Thus, the opposed walls 52 of the slit 45 are moved from a normally engaged relation to a spaced relation in response to the application of pressure on the underside 51, and permit the solution to be drawn through the opening 50 (FIG. 4) formed thereby into the pump 12.

Referring to FIG. 4 wherein the distorted valve element 44 is shown in plan view, due to the provision of the right angular end legs 47 and 48, a pair of right-angle triangular flaps 53 and 54 formed by the Z-shaped slit 45 are clearly illustrated. The Z-shaped slit 45 is seen, consequently, to provide for a bending or yielding of each flap 53 and 54 principally along its hypotenuse 56 and 57, respectively (see dot-dash lines in FIG. 3). Thus, upon the application of the fluid pressure on the underside 51 of the valve element 44, the flaps 53 and 54 tend to bend or yield in substantially parallel, opposed direction, as indicated by the arrows in FIG. 4, which directions of yielding are not normal to the longitudinal axis of the main leg 46.

With a certain quantity of solution within the pump 12, the valve element 44 returns to its normally flat, closed position, the element 44 being sufficiently rigid to remain non-distorted under the normal pressure of the solution within the pump. The pump 12 can then be lifted out of the container 11 and carried to a place for discharge of the solution without the solution leaking from the pump 12.

By depressing the handle 26 and forcing the piston unit 21 against the solution contained within the pump 12, the resultant pressure against the top side 58 (FIG. 3) of the valve element 44 causes it to distort downwardly. This distortion is the exact opposite of that depicted in FIGS. 4–6 inclusive, and permits the solution to be expelled from the pump 12 through the coupling 36. The pump 12 can then be inserted back into the container 11 for the next use.

Although a preferred embodiment of the invention has been disclosed herein, it is to be understood that modifications and alterations can be made thereto within the scope of the invention as defined by the appended claims.

I claim:

1. A check valve unit comprising a substantially flat element of resilient material having a normally closed Z-shaped slit formed therein, and means securing the edges of said element against movement, said element distortable to open said slit for the passage of fluid therethrough in response to the application of a fluid under pressure against either side of said element.

2. In a check valve, an element having a portion of resilient material, a Z-shaped slit formed in said portion, the walls of said slit movable from an engaged relation to a spaced relation to open said slit in response to an application of pressure on either side of said portion.

3. In a check valve, an element having a substantially flat portion of resilient material, a Z-shaped slit means formed in said portion with a pair of right angle triangular flaps, the walls of adjacent sides of said flaps normally engaged, said flaps bendable away from each other in substantially parallel, opposed directions in response to the application of a pressure on either side of said portion, whereby said walls of said adjacent sides are spaced from each other.

References Cited in the file of this patent

UNITED STATES PATENTS

| | | |
|---|---|---|
| 156,908 | Brock | Nov. 17, 1874 |
| 236,719 | Renton | Jan. 18, 1881 |
| 670,794 | Lott | Mar. 26, 1901 |
| 2,193,517 | Lindstrom | Mar. 12, 1940 |
| 2,720,881 | Jones | Oct. 18, 1955 |
| 3,047,013 | Baumbach | July 31, 1962 |